United States Patent
Abdesselem et al.

(10) Patent No.: US 6,519,279 B1
(45) Date of Patent: Feb. 11, 2003

(54) TRANSCEIVER CIRCUITRY, PORTABLE COMMUNICATION DEVICE AND METHOD FOR PERFORMING RADIO COMMUNICATION

(75) Inventors: Ouelid Abdesselem, Toulouse (FR); Lydie Desperben, Cafarelli Toulouse (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/477,984

(22) Filed: Jan. 5, 2000

(51) Int. Cl.[7] .................................................. H04L 5/16
(52) U.S. Cl. ........................ 375/219; 375/261; 375/298; 375/302; 704/208; 704/214; 704/275; 704/501; 704/504
(58) Field of Search ................................ 375/219, 222, 375/261, 266, 268, 285, 295, 298, 300, 302, 320, 322; 704/208, 214, 235, 260, 275, 500, 503, 504, 501

(56) References Cited

U.S. PATENT DOCUMENTS

| | | | | |
|---|---|---|---|---|
| 5,577,087 A | * | 11/1996 | Furuya | 370/337 |
| 5,909,469 A | * | 6/1999 | Frodigh et al. | 370/465 |
| 6,088,347 A | * | 7/2000 | Minn et al. | 370/342 |
| 6,167,031 A | * | 12/2000 | Olofsson et al. | 370/252 |
| 6,208,663 B1 | * | 3/2001 | Schramm et al. | 370/465 |
| 6,272,166 B1 | * | 8/2001 | Dabak | 370/335 |
| 6,304,593 B1 | * | 10/2001 | Alouini et al. | 375/216 |

FOREIGN PATENT DOCUMENTS

| | | | |
|---|---|---|---|
| WO | WO 98/19481 | 5/1998 | H04Q/7/22 |
| WO | WO98/19481 | 5/1998 | H04Q/7/22 |
| WO | WO98/38763 | 9/1998 | H04L/1/12 |
| WO | WO 98/38763 | 9/1998 | H04L/1/12 |

OTHER PUBLICATIONS

Hakan Olofsson et al., "XP–002104616 Aspects of Introducing EDGE in Existing GSM Networks", 1998 IEEE, pp. 421–426.

Olofsson et al., "Aspects of Introducing EDGE in Existing GSM Networks," IEEE, pp. 421–426 (1998).

European Search Report (3 pgs.)

* cited by examiner

Primary Examiner—Stephen Chin
Assistant Examiner—Dac V. Ha
(74) Attorney, Agent, or Firm—Lawrence J. Chapa

(57) ABSTRACT

Transceiver circuitry 1 comprises a first portion 10,20,30, 41,50,100, having a first modulation means 41 operating at a first order of modulation, for transmitting and receiving voice signals; a second portion 20,30,42,50,100, having a second modulation means 42 operating at a second order of modulation, for transmitting and receiving digital signals at a higher data rate than is achievable by the first portion; and a data conversion means 20,30,100 operable to convert from or into voice signals intended for processing by the first portion into or from digital signals for processing by the second portion.

14 Claims, 1 Drawing Sheet

TRANSCEIVER CIRCUITRY, PORTABLE COMMUNICATION DEVICE AND METHOD FOR PERFORMING RADIO COMMUNICATION

FIELD OF THE INVENTION

The present invention relates particularly to transceiver circuitry, a portable communication device and to a method for performing radio communication.

BACKGROUND OF THE INVENTION

Digital portable communication devices for communicating voice signals have been successfully developed and manufactured. In particular, GSM devices have been particularly successful for communicating voice signals. However, voice signals require only a relatively small bandwidth compared to video or other multimedia signals. In order to provide communication devices with a larger bandwidth capability for transmitting data signals such as video signals, it has been proposed to develop a device which incorporates a data portion for dealing with data signals requiring a higher bandwidth than voice signals. The data portion achieves the higher bandwidth by using a higher order of modulation compared to GSM. The use of a higher order of modulation will require new base stations to be deployed which are capable of dealing with the higher order of modulation, and each such base station will only be able to cover a smaller geographical area than a conventional GSM base station. For these reasons, the data portion will often not be able to work in places where a conventional GSM communication device would be able to work unless and until full coverage by the new base-stations is achieved. Therefore, according to one proposal for providing an improved data rate, referred to as Enhanced Data-rate for GSM Evolution (EDGE) it is proposed that all larger data capability devices will also include a separate GSM portion for dealing with voice signals.

SUMMARY OF THE INVENTION

According to a first aspect of the present invention, there is provided transceiver circuitry comprising: a first portion, having a first modulation means operating at a first order of modulation, for transmitting and receiving voice signals; a second portion, having a second modulation means operating at a second order of modulation, for transmitting and receiving digital signals at a higher data rate than is achievable by the first portion; and a data conversion means operable to convert from or into voice signals intended for processing by the first portion into or from digital signals for processing by the second portion.

The term order of modulation is used here to refer to the number of bits which each transmitted or received symbol represents. Thus in GSM, a modulation scheme referred to as GMSK (Gaussian Minimum Shift Keying) is used in which each symbol represents only a single bit, and this corresponds to a single order of modulation. In an alternative modulation scheme referred to as 8PSK, each symbol represents 3 bits of data which corresponds to a triple order of modulation. According to a preferred embodiment of the present invention, the first order of modulation is preferably a single order of modulation, and the second order of modulation is preferably a triple order of modulation although it may be only a double order of modulation.

Transceiver circuitry according to the present invention enables certain advantages associated with sending voice signals at a higher data rate than is achievable by the GSM portion. For example, when a higher data rate is available for sending voice signals (because a base station and handset both able to demodulate the higher order of modulation are sufficiently close to one another), it is possible to provide more protection to the encoded voice signals to render the signals less susceptible to distortion as a result of interference on the channel, etc. Alternatively, in a particularly advantageous embodiment, it is possible to use voice signals encoded by a vocoder adapted for use with GMSK modulation in a full rate type multiplexing scheme in which one time-slot is required in every Time Division Multiple Access (TDMA) frame (i.e. a full-rate vocoder), in a half-rate type multiplexing scheme which requires an allocation of only one time-slot in every two TDMA frames with 8PSK modulation, thus permitting twice as many users in a single cell as in the conventional case (i.e. Twice as many as would be possible with a GSM device using a full-rate vocoder) without the disadvantages associated with using a half-rate vocoder (ie of using less information to represent the speech signal input to the vocoder and thus being more susceptible to errors associated with of the loss of one or more bursts).

The basic multiplexing schemes (FR and HR) used in higher order of modulation are the same as in lower order of modulation. The same mapping of bursts in the TDMA frames apply.

Furthermore, the data conversion means according to the present invention may be surprisingly simple as result of the use by the second portion of a higher order of modulation resulting in an integer-multiple increase in the data rate available via the second portion compared with the first (GSM) portion (e.g. 2 or 3, etc. times the data rate achievable by the first portion). Additionally, conventional GSM vocoders may be used in the device according to the present invention and they may be used to generate or to decode the signals to be transmitted or having been received by either the first or second portions. That is to say, that the data conversion means will simply work with the conventional GSM vocoders and does not require any vocoding means of its own.

The data conversion means preferably comprises a digital signal processor with some spare processing capacity. According to one preferred embodiment, the data conversion means comprises a channel coding means together with a multiplexing and interleaving means and a controller able to alter the mode of operation of the channel coding means and the multiplexing and interleaving means in such a way as either to provide bursts of data suitable for modulation by the first modulation means or by the second modulation means.

According to a second aspect of the present invention, there is provided a communication device comprising transceiver circuitry comprising: a first portion, having a first modulation means operating at a first order of modulation, for transmitting and receiving voice signals; a second portion, having a second modulation means operating at a second order of modulation, for transmitting and receiving digital signals at a higher data rate than is achievable by the first portion; and a data conversion means operable to convert from or into voice signals intended for processing by the first portion into or from digital signals for processing by the second portion.

According to a third aspect of the present invention, there is provided a method of transmitting a voice signal comprising the steps of generating a first data signal representative of the voice signal to be transmitted, selecting between a first portion, having a first modulation means operating at a first order of modulation, for transmitting and receiving voice signals, and a second portion, having a second modulation means operating at a second order of modulation, for transmitting and receiving digital signals at a higher data rate than is achievable by the first portion, and, if the second portion is selected, converting the first data signal representative of the voice signal to be transmitted into a second data signal representative of the voice signal to be transmitted.

Preferably the step of selecting between the first and second portions includes assessing whether or not the second portion is in a location where it is able to communicate with a suitable receiver. That is to say, if a receiver capable of demodulating the signals transmitted by the second portion is sufficiently close to the device containing the second portion as to be able to receive signals transmitted by the second portion without excessive distortion, then the second portion will preferably be selected; otherwise, the first portion will preferably be selected.

According to a fourth aspect of the present invention, there is provided a method of receiving a voice signal comprising the steps of selecting between a first portion, having a first modulation means operating at a first order of modulation, for transmitting and receiving voice signals, and a second portion, having a second modulation means operating at a second order of modulation, for transmitting and receiving digital signals at a higher data rate than is achievable by the first portion, and, if the second portion is selected, converting the output signal from the second portion into a digital voice signal for conversion by a suitable GSM decoder.

Preferably the step of selecting between the first and second portions includes assessing whether or not the second portion is in a location where it is able to communicate with a suitable transmitter. That is to say, if a transmitter capable of modulating the signals for reception by the second portion is sufficiently close to the device containing the second portion as to be able to transmit signals to the second portion without excessive distortion, then the second portion will preferably be selected; otherwise, the first portion will preferably be selected.

BRIEF DESCRIPTION OF THE DRAWINGS

In order that the present invention may be better understood, an embodiment thereof will now be described, by way of example only, with reference to the accompanying drawings in which.

DETAILED DESCRIPTION OF THE INVENTION

Figure 1:
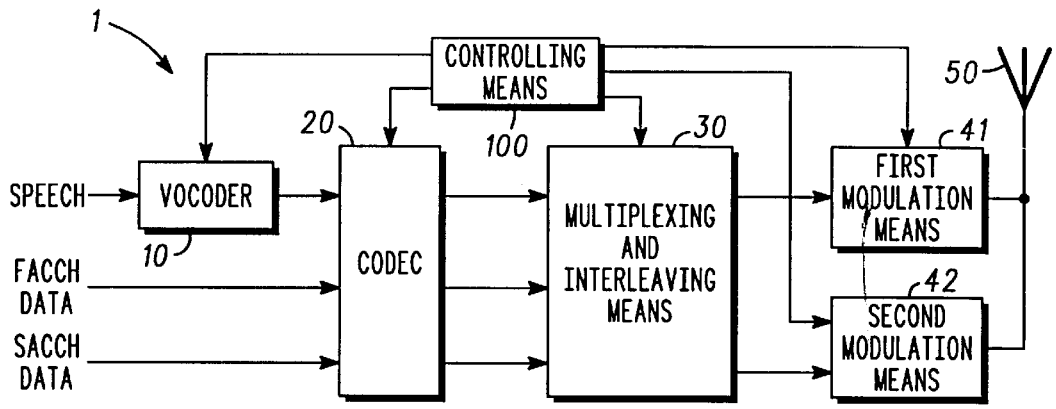
FIG. 1 is a block diagram which conceptually illustrates an embodiment of the present invention.

FIG. 1 illustrates in block diagram format some of the transceiver circuitry for use in a portable communication device in accordance with the present invention. The transceiver circuitry 1 comprises a vocoder 10, channel coding means or codec 20, multiplexing and interleaving means 30, first modulation means 41, second modulation means 42, aerial 50 and controlling means 100. This circuitry 1 is able to transmit speech signals either in a conventional manner using a conventional Gaussian Minimum Shift Keying modulation technique (using the first modulation means 41) or by taking advantage of the higher data rates achievable when a higher order modulation means (such as the second modulation means 42).

To transmit speech signals in a conventional manner, the speech signal to be transmitted is input to vocoder 10 which outputs a digital signal which is representative of the input signal. Such a vocoder for use, in a GSM system is well known and will not be described here in detail, except to comment that different vocoders are known for use in GSM systems. These GSM vocoders can be mapped either on Full Rate (FR) multiplexing scheme or on Half Rate (HR) multiplexing scheme (described below).

The digital signal output by the vocoder 10 is input to codec 20 together with any additional data to be transmitted such as Fast Associated Control CHannel (FACCH) data or Slow Associated Control CHannel (SACCH) data. The codec 20 essentially processes the data signals input to it to generate output signals which correspond to the input signals but which include an amount of redundancy therein such that if some bits in the signal are "lost" the receiver will usually be able to detect that there has been such a loss and may even be able to recover the lost bits. Again, the operation of suitable codecs are well known and the operation of codec 20 will not be further discussed in relation to conventional GSM speech transmission, except to say that when the circuitry is operating in the conventional mode, with vocoder 10 outputting a digital signal at less than 22.8 kbits/s (typically 13 kbits/s), codec 20 will output a channel coded speech signal at approximately 22.8 kbits/s.

The coded speech signal output by the codec 20 is input to the multiplexing and interleaving means 30 whose operation is also well known and understood in the art and whose operation will only therefore be briefly discussed here. Multiplexing and interleaving means 30 receives a number of different signals simultaneously and multiplexes them (i.e. it determines which order the signals will be sent in). It also performs interleaving (e.g. dispatching bits of a block of data into groups of data, each group of data being destined to be sent in its own respective burst). In the conventional GSM mode the multiplexing and interleaving means organises the interleaved groups (together with some burst format data bits and a midamble) into burst groups which are delivered to the first modulation means 41 (a GMSK modulator) at appropriately spaced times to occupy well defined periodic time-slots within the TDMA frame structure once the burst groups have been used to modulate the appropriate carrier frequency by the modulation means 41. The signal output by the modulation means 41 is radiated by means of aerial 50.

Figure 2:
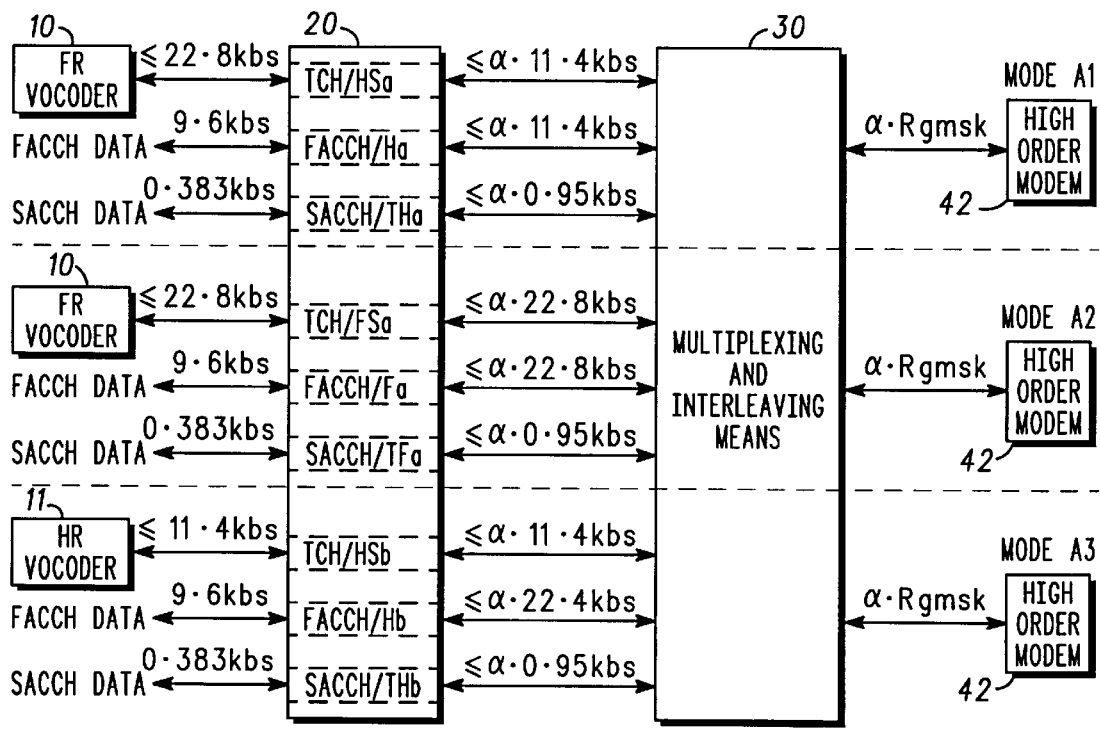
FIG. 2 is a block diagram illustrating three multiplexing and interleaving schemes in accordance with the present invention.

The mode of operation of the channel codec 20 and multiplexing and interleaving means 30 is determined by the controller 100. Thus, when the transmitting circuitry is in a location in which it can communicate with a receiver adapted to receive signals modulated by the second modulation means 42, the controller may cause the channel codec 20 and multiplexing and interleaving means 30 to operate in any one of a number of alternative modes for advantageously transmitting speech signals. Note that in all these alternative modes of operation, the operation of the vocoder 10 is unaffected (different types of vocoder may be used— e.g. HR or EFR vocoders—resulting in different modes of operation of the channel codec 20 and multiplexing and interleaving means 30, but the operation of the vocoders is not altered). Referring to FIG. 2, the mode of operation is chosen so the data rate after channel coding is equal to $\alpha$.22.8 kbps for FR schemes and $\alpha$.11.4 kbps for HR schemes.

Referring still to FIG. 2, three alternative or non-conventional modes of operation of the channel codec 20 and multiplexing and interleaving means 30 will now be described. In all three methods to be described, the multiplexing and interleaving means 30 outputs burst groups of data not to the first modulation means 41 but to the second modulation means 42 which operates at a higher order of modulation than the first modulation means 41. Note that the first modulation means is a GMSK modulator which means that each modulating symbol can only be 1 bit; by contrast, with the second modulation means each symbol can represent 2, 3 or possibly more bits depending on the order of modulation of the second modulation means 42. Thus, for example, the second modulation means may be an 8 position Phase Shift Keyed (8PSK) modulator which can cope with 3-bit symbols or a 4 position PSK modulator which can cope with 2-bit symbols.

The block diagram of FIG. 2 illustrates 3 possible alternative modes of operation of the channel codec 20 and multiplexing and interleaving means 30 (MODE A1, MODE A2, MODE A3). Note, all of the arrows (which represent signals) are double-ended to indicate that the processes are essentially reversible with left to right movement of signals representing transmission and right to left representing reception.

In Mode A1, an FR vocoder 10 generates typically a 13 kbits/s signal (in fact it generates blocks of 260 bits every 20 ms) in a known manner and communicates this to the channel codec 20; channel codec 20 performs suitable coding on this signal to generate a protected signal having a data rate of up to $\alpha$.11.4 kbits/s (corresponding to blocks of $\alpha$ times 228 bits every 20 ms). A number of algorithms suitable for performing such channel coding will be readily apparent to persons skilled in the art based on the type of algorithms currently known for performing channel coding when operating in a conventional mode; indeed, where $\alpha=2$ (corresponding to modulation means 42 having a double order of modulation) the output rate from the channel codec 20 is optimally 22.8 kbits/s which is the same as for full rate multiplexing in the conventional GSM case, and therefore in this case it is possible for the channel codec 20 to use exactly the same channel coding (and therefore channel coding algorithm) as for conventional Full rate speech coding. If $\alpha=3$ which is the 8PSK case, a different channel coding can be used which introduces more redundancy and therefore protection to the signal input to the channel codec 20. Suitable such channel coding is not explicitly described herein but is readily devisable by a person skilled in the art. The entire traffic channel after the vocoder 10 will be referred to below as TCH/HSa (Half-rate Speech Traffic CHannel—the "a" suffix indicates that this is not the conventional Half-rate Speech Traffic CHannel TCH/HSa).

The interleaving process in MODE A1 divides up and arranges the coded signals belonging to the TCH/HSa channel input to the multiplexing and interleaving means 30 into burst groups for transmission in separate frames in a corresponding manner to the way in which it is done for the conventional TCH/HS channel. That is, each block of data (of up to $\alpha$ times 228 bits) output by the channel codec 20 is separated into 4 groups of data (of up to $\alpha$ times 57 bits) each of which will occupy substantially half a burst (i.e. $\alpha$ times 57 bits excluding the midamble), and these groups are diagonally interleaved over 4 alternate frames (i.e. 8 frames in total, but a single burst is transmitted only in every other frame—each frame having a duration of 8 burst periods—the corresponding time slots in each intermediate frame being reserved for use by another user). The only difference in the groups of data for transmission in a single burst between TCH/HSa and TCH/HS is that each group in the MODE A1 TCH/HSa will contain $\alpha$ times 57 bits instead of only 57 bits in the conventional TCH/HS.

Turning now to the FACCH/Ha channel (associated with MODE A1), when a block of Fast Associated Control data needs to be transmitted, a block comprising 184 bits is input to the channel codec 20 which performs suitable coding on this block to generate a block of $\alpha$ times 228 bits; as before, if $\alpha=2$, the same coding can be used as for conventional FACCH/F data, otherwise (i.e. if $\alpha=3$ or more) a new type of coding can be used which will give more redundancy and thus more protection to the control data. As in the conventional case for FACCH/F data, a whole speech block is stolen by the FACCH/Ha under the direction of the multiplexing and interleaving means 30, and then sent as a 4 deep diagonally interleaved set. Note this is different to the conventional case for the FACCH/H channel in which each coded block of control data is twice as large as a coded speech block, resulting in 2 adjacent speech blocks being stolen and a half diagonal, half rectangular interleaving scheme which is 6 deep.

Turning now to the SACCH/Tha channel (associated with MODE A1), a block of SACCH data (of 184 bits) needs to be sent every 480 ms (corresponding to a data rate of 0.383 kbits/s); this corresponds to one block of SACCH being sent for every 104 TDMA frames (each of which comprises 8 burst periods only one of which is used by a single handset) or over 4 multi-frames (each multi-frame comprising 26 frames). As in conventional half rate and full rate schemes, only one SACCH burst is sent in every multi-frame, and 4 multi-frames must be received to receive a full block of SACCH data. The difference is that owing to the higher order of modulation, each burst can carry $\alpha$ times the amount of data compared to either conventional case (i.e. half rate or full rate) such that channel codec 20 can use a new channel coding algorithm which introduces up to $\alpha$ times the redundancy, and therefore the protection, to the SACCH data.

MODE A1 offers the advantages of the conventional half rate speech mode, namely that on average only 1 in every 16 burst periods (i.e. every two frames) is required thus allowing 2 dedicated speech channels but overcomes most of the disadvantages associated with the conventional half rate speech mode, namely the poor quality of speech transmitted in practice owing to there being insufficient protection and interleaving to allow error correction at the receiver end. Surprisingly, MODE A1 provides for sufficiently good speech quality to make it acceptable to network operators despite still only having an interleaving depth of 4 because of the use of full rate vocoders together with more protection of the output signal from the vocoder than is possible in the conventional half rate mode. The other advantage of using MODE A1 is that power consumed by a portable communications device can be reduced as a result of having to transmit almost half as many bursts as in the conventional case (although this benefit will be reduced by any extra power consumption of the more complex second modulation means compared to the first modulation means).

Turning now to MODE A2, this mode is very similar to the conventional full rate speech mode except that the output from the channel codec 20 is $\alpha$ times as great as in the conventional case enabling much more redundancy and therefore protection of the coded speech signal. This mode will be more robust than the conventional full rate speech mode and will therefore be suited for occasions when the speech quality is poor in the conventional full rate mode as a result of being located in a particularly adverse location (e.g. lots of differently sized buildings or similar obstructions).

MODE A3 is very similar to the conventional half rate speech mode except that the output from the channel codec 20 is times as great as in the conventional case enabling much more redundancy and therefore protection of the coded speech signal. This mode will be more robust than the conventional half rate speech mode and will therefore be acceptable to network operators who currently do not use conventional half rate modes because the speech quality is generally unsatisfactorily poor. Note in this case, unlike in MODE A1, a block of FACCH data after channel coding by channel codec 20 contains up to twice as many bits as each speech block after coding from the channel codec 20, and thus each FACCH block steals 2 speech blocks and is interleaved in the conventional way for the conventional half rate mode (i.e. over 6 frames in a half diagonal, half rectangular manner as is well known in the art). Clearly to contain up to twice as many bits as a speech block, the block of FACCH data has been given much more protection by the channel codec 20 than in the conventional half rate case; this is useful in cases where the choice of higher order modulation causes more errors in interpreting the symbol exactly correctly.

Many alternative embodiments in accordance with the present invention may be envisaged such as quarter rate modes in which only one frame in every four (on average) is used to form a single dedicated channel when a sufficiently high order of modulation is used to enable a single block of speech, after channel encoding, to be divided into 2 groups of data each of which will occupy half a burst and to be transmitted over 2 frames using diagonal interleaving. In such a quarter rate mode, SACCH data, after channel encoding, preferably occupies only 2 full bursts and is ideally diagonally interleaved over 4 multiframes with another block of SACCH data belonging to a different channel.

Furthermore, it will be apparent that the present invention also applies to base stations as it does to portable communication devices or mobile units with the relevant modifications which are necessary for base stations compared to mobile units.

Similarly, hybrid modes of operation of those described above may be employed such as, for example, using a half rate type mode in which each block of FACCH data, after channel encoding, is only as large as a single block of speech data after encoding and therefore need only steal a single block of speech data as in MODE A1 type operation.

Similarly, new vocoder types could be specified together with channel coding to operate with the second modulation means. In that latest case, the multiplexing schemes can remain as for the second modulation means as long as the bit rate at the output of the channel coder does not exceed $\alpha$.22.8 kbps for FR and $\alpha$.11.4 kbps for HR.

We claim:

1. Transceiver circuitry comprising: a first portion, having a first modulation means operating at a first order of modulation, for transmitting and receiving voice signals; a second portion, having a second modulation means operating at a second order of modulation, for transmitting and receiving digital signals at a higher data rate than is achievable by the first portion; and a data conversion means operable to convert, in accordance with a data conversion scheme, from or into encoded voice signals into or from digital signals transmitted from or to said first or second modulation means, wherein voice signals encoded by a vocoder adapted for use in a full rate data conversion scheme are converted to or from digital signals transmitted from or to said second modulation means using a half-rate data conversion scheme.

2. Transceiver circuitry as claimed in claim 1 wherein the first order of modulation is a single order of modulation, and the second order of modulation is a triple order of modulation.

3. Transceiver circuitry as claimed in claim 1 wherein the first order of modulation is a single order of modulation, and the second order of modulation is a double order of modulation.

4. Transceiver circuitry as claimed in claim 1 wherein the second modulation means reuses the same full rate and half rate data conversion schemes as the first modulation means.

5. Transceiver circuitry as claimed in claim 1 wherein the data conversion means comprises a channel coding means together with a multiplexing and interleaving means and a controller able to alter the mode of operation of the channel coding means and the multiplexing and interleaving means in such a way as either to provide bursts of data suitable for modulation by the first modulation means or by the second modulation means.

6. A communication device comprising transceiver circuitry comprising: a first portion, having a first modulation means operating at a first order of modulation, for transmitting and receiving voice signals; a second portion, having a second modulation means operating at a second order of modulation, for transmitting and receiving digital signals at a higher data rate than is achievable by the first portion; and a data conversion means operable to convert, in accordance with a data conversion scheme, from or into encoded voice signals into or from digital signals transmitted from or to said first or second modulation means, wherein voice signals encoded by a vocoder adapted for use in a full rate data conversion scheme are converted to or from digital signals transmitted from or to said second modulation means using a half-rate data conversion scheme.

7. A communication device as claimed in claim 6 wherein the first order of modulation is a single order of modulation, and the second order of modulation is a triple order of modulation.

8. A communication device as claimed in claim 6 wherein the first order of modulation is a single order of modulation, and the second order of modulation is a double order of modulation.

9. A communication device as claimed in claim 6 wherein the second modulation means reuses the same full rate and half rate multiplexing schemes as the first modulation means.

10. A communication device as claimed in claim 6 wherein the data conversion means comprises a channel coding means together with a multiplexing and interleaving means and a controller able to alter the mode of operation of the channel coding means and the multiplexing and interleaving means in such a way as either to provide bursts of data suitable for modulation by the first modulation means or by the second modulation means.

11. A communication device as claimed in claim 6 wherein the communication device is a portable communication device.

12. A communication device as claimed in claim 6 wherein the communication device is a base station.

13. A method of transmitting a voice signal comprising the steps of generating a first data signal representative of the voice signal to be transmitted, selecting between a first portion, having a first modulation means operating at a first order of modulation, for transmitting and receiving voice signals, and a second portion, having a second modulation means operating at a second order of modulation, for transmitting and receiving digital signals at a higher data rate than is achievable by the first portion, and, if the second portion is selected, converting voice signals encoded by a vocoder adapted for use in a full rate data conversion scheme to digital signals to be transmitted from said second modulation means in accordance with a half-rate data conversion scheme.

14. A method of receiving a voice signal comprising the steps of selecting between a first portion, having a first modulation means operating at a first order of modulation, for transmitting and receiving voice signals, and a second portion, having a second modulation means operating at a second order of modulation, for transmitting and receiving digital signals at a higher data rate than is achievable by the first portion, and, if the second portion is selected, converting, using a half-rate data conversion scheme, digital signals transmitted to said second modulation means into encoded voice signals encoded by a vocoder adapted for use in a full rate data conversion scheme.

* * * * *